US008040695B2

(12) United States Patent
Reilly

(10) Patent No.: US 8,040,695 B2
(45) Date of Patent: Oct. 18, 2011

(54) METHOD FOR PORTIONING OUTPUT CURRENT OF A DC-DC CONVERTER

(75) Inventor: David E. Reilly, Concord, MA (US)

(73) Assignee: American Power Conversion Corporation, West Kingston, RI (US)

( * ) Notice: Subject to any disclaimer, the term of this patent is extended or adjusted under 35 U.S.C. 154(b) by 238 days.

(21) Appl. No.: 12/403,771

(22) Filed: Mar. 13, 2009

(65) Prior Publication Data
US 2010/0232189 A1 Sep. 16, 2010

(51) Int. Cl.
*H02M 3/335* (2006.01)
(52) U.S. Cl. .............................. 363/17; 363/98; 363/132
(58) Field of Classification Search .................. 363/23, 363/21.01, 16, 17, 37, 40, 21.06, 56.02, 132, 363/136; 323/282, 288
See application file for complete search history.

(56) References Cited

U.S. PATENT DOCUMENTS

| | | | |
|---|---|---|---|
| 4,648,015 A | 3/1987 | Davis et al. | |
| 5,172,308 A | 12/1992 | Tohya | |
| 6,141,232 A | 10/2000 | Weinmeier et al. | |
| 6,400,591 B2 | 6/2002 | Reilly et al. | |
| 6,404,658 B1 | 6/2002 | Reilly | |
| 6,600,298 B2 | 7/2003 | McDonald et al. | |
| 6,630,751 B2 | 10/2003 | Curtis et al. | |
| 6,728,119 B2 | 4/2004 | Reilly et al. | |
| 7,446,512 B2 * | 11/2008 | Nishihara et al. | 323/233 |
| 2002/0054498 A1 | 5/2002 | Cho et al. | |
| 2005/0162019 A1 | 7/2005 | Masciarelli et al. | |
| 2005/0243580 A1* | 11/2005 | Lyle, Jr. | 363/16 |
| 2006/0256586 A1* | 11/2006 | Ohshima et al. | 363/16 |
| 2009/0109710 A1* | 4/2009 | Nakahori | 363/17 |

FOREIGN PATENT DOCUMENTS
WO 2004098035 A1 11/2004

OTHER PUBLICATIONS
International Search Report and Written Opinion from corresponding International Application No. PCT/US2010/026949 dated Jun. 17, 2010.

* cited by examiner

*Primary Examiner* — Adolf Berhane
*Assistant Examiner* — Nguyen Tran
(74) *Attorney, Agent, or Firm* — Lando & Anastasi, LLP

(57) ABSTRACT

At least some aspects of the invention are directed to methods and apparatus for controlling an uninterruptible power supply and subsystems of a UPS. A first aspect of the invention is directed to a method of controlling a DC-DC converter having a predetermined maximum peak load current value. The DC-DC converter has first and second outputs to couple to a load with a capacitor coupled across the first and second outputs. The method includes in a first mode of operation, charging the capacitor to a predetermined output voltage value, and in a second mode of operation, providing output current having the maximum peak load current value to a load coupled to the output of the DC-DC converter, wherein a first portion of the output current is provided by the DC-DC converter and a second portion of the output current is provided by discharging the capacitor to a voltage value that is less than the predetermined output voltage value.

19 Claims, 3 Drawing Sheets

METHOD FOR PORTIONING OUTPUT CURRENT OF A DC-DC CONVERTER

BACKGROUND OF INVENTION

1. Field of Invention

At least one embodiment of the invention relates generally to a method for providing uninterruptible, regulated power to critical and/or sensitive loads. More specifically, at least one embodiment of the invention relates to control of a DC-DC converter of an uninterruptible power supply.

2. Discussion of Related Art

The use of uninterruptible power supplies to provide regulated, uninterrupted power for sensitive and/or critical loads, such as computer systems and other data processing systems, is known. A number of different UPS products are available including those identified under the trade name SMART-UPS from American Power Conversion Corporation of West Kingston R.I. In a typical UPS, a battery is used to provide backup power for a critical load during blackout or brownout conditions and a DC-DC converter may be used in conjunction with the battery.

SUMMARY OF THE INVENTION

A first aspect of the invention is directed to a method of controlling a DC-DC converter having a predetermined maximum peak load current value. The DC-DC converter has first and second outputs to couple to a load with a capacitor coupled across the first and second outputs. The method includes in a first mode of operation, charging the capacitor to a predetermined output voltage value, and in a second mode of operation, providing output current having the maximum peak load current value to a load coupled to the output of the DC-DC converter, wherein a first portion of the output current is provided by the DC-DC converter and a second portion of the output current is provided by discharging the capacitor to a voltage value that is less than the predetermined output voltage value.

In the method, the DC-DC converter can include an input to couple to a DC source having a DC voltage, a plurality of switches configured to convert the DC voltage to an AC voltage, a transformer having a first winding and a second winding, the first winding being coupled to the plurality of switches and the second winding being coupled to the first and second outputs, and the method can further include controlling the plurality of switches to limit current in the second winding to a value that is less than the maximum peak load current value. In one version, the voltage value is approximately 50% of the maximum peak load current value. The method may further include receiving input power at the input from a battery, and may include providing the output current to the input of an inverter circuit. The method may include controlling the plurality of switches and the inverter circuit using a controller contained within an uninterruptible power supply. In the first mode of operation, the method may include providing output current having a value that is less than the maximum peak load current.

Another aspect of the invention is directed to an uninterruptible power supply (UPS) that includes an input to receive power from a first power source, an output to provide power to a load, an inverter coupled to the output, a second input to receive power from a second power source, a DC-DC converter coupled to the second input and including first and second outputs coupled to the inverter, a capacitor coupled across the first and second outputs, and a controller coupled to the DC-DC converter. The controller is configured to control the DC-DC converter in a first mode of operation to charge the capacitor to a predetermined output voltage value, and configured to control the DC-DC converter in a second mode of operation to provide output current having a maximum peak load current value, wherein a first portion of the output current is provided by the DC-DC converter and a second portion of the output current is provided by discharging the capacitor to a voltage value that is less than the predetermined output voltage value.

In the UPS, the DC-DC converter may further include a plurality of switches configured to convert the DC voltage to an AC voltage, a transformer having a first winding and a second winding, the first winding being coupled to the plurality of switches and the second winding being coupled to the first and second outputs, and the controller may be further configured to control the plurality of switches to limit current in the second winding to a value that is less than the maximum peak load current value, and the value may be approximately 50% of the maximum peak load current value. The UPS may include the second power source, and the second power source may include a battery. In the UPS, the controller may be further configured to control the DC-DC converter in the first mode of operation to provide output current to the inverter having a value that is less than the maximum peak load current.

Another aspect of the invention is directed to a process for producing a DC-DC converter having a peak load current value, a peak load current duration, a nominal DC output voltage, and an allowable minimum output voltage. The process includes determining a modified peak load current value for the DC-DC converter by multiplying the peak load current value by a factor less than 1, determining a modified DC-DC load current duration for the DC-DC converter by dividing the peak load current duration by the factor, and designing a power stage of the DC-DC converter using the modified peak load current value and the modified DC-DC load current duration.

The method may further include building the power stage of the DC-DC converter based on the design. The method may also include determining a value of an output capacitor for the DC-DC converter based at least in part on the nominal DC output voltage and the allowable minimum output voltage, and coupling the output capacitor to the power stage. The method may further include coupling a controller to the DC-DC converter, wherein the controller is configured to control components of the power stage, and to limit current from the power stage to the modified DC-DC load current value. In the process, the factor may be equal to 0.5.

Yet another aspect of the invention is directed to an uninterruptible power supply (UPS) that includes an input to receive power from a first power source, an output to provide power to a load, an inverter coupled to the output, a second input to receive power from a second power source, a DC-DC converter coupled to the second input and including first and second outputs coupled to the inverter, a power stage that provides output power at the first and second outputs, and a capacitor coupled across the first and second outputs. The UPS further includes means for controlling the DC-DC converter in a first mode of operation to charge the capacitor to a predetermined output voltage value, and for controlling the DC-DC converter in a second mode of operation to provide output current having a maximum peak load current value, such that a first portion of the output current is provided by the power stage and a second portion of the output current is provided by discharging the capacitor to a voltage value that is less than the predetermined output voltage value.

In the UPS, the DC-DC converter may further include a plurality of switches configured to convert the DC voltage to an AC voltage, a transformer having a first winding and a second winding, the first winding being coupled to the plurality of switches and the second winding being coupled to the first and second outputs. In the UPS, the value may be approximately 50% of the maximum peak load current value, and the UPS may further include the second power source, and the second power source may include a battery.

BRIEF DESCRIPTION OF DRAWINGS

The accompanying drawings are not intended to be drawn to scale, in the drawings, each identical or nearly identical component that is illustrated in various figures is represented by a like numeral. For purposes of clarity, not every component may be labeled in every drawing. In the drawings.

DETAILED DESCRIPTION

Figure 1:
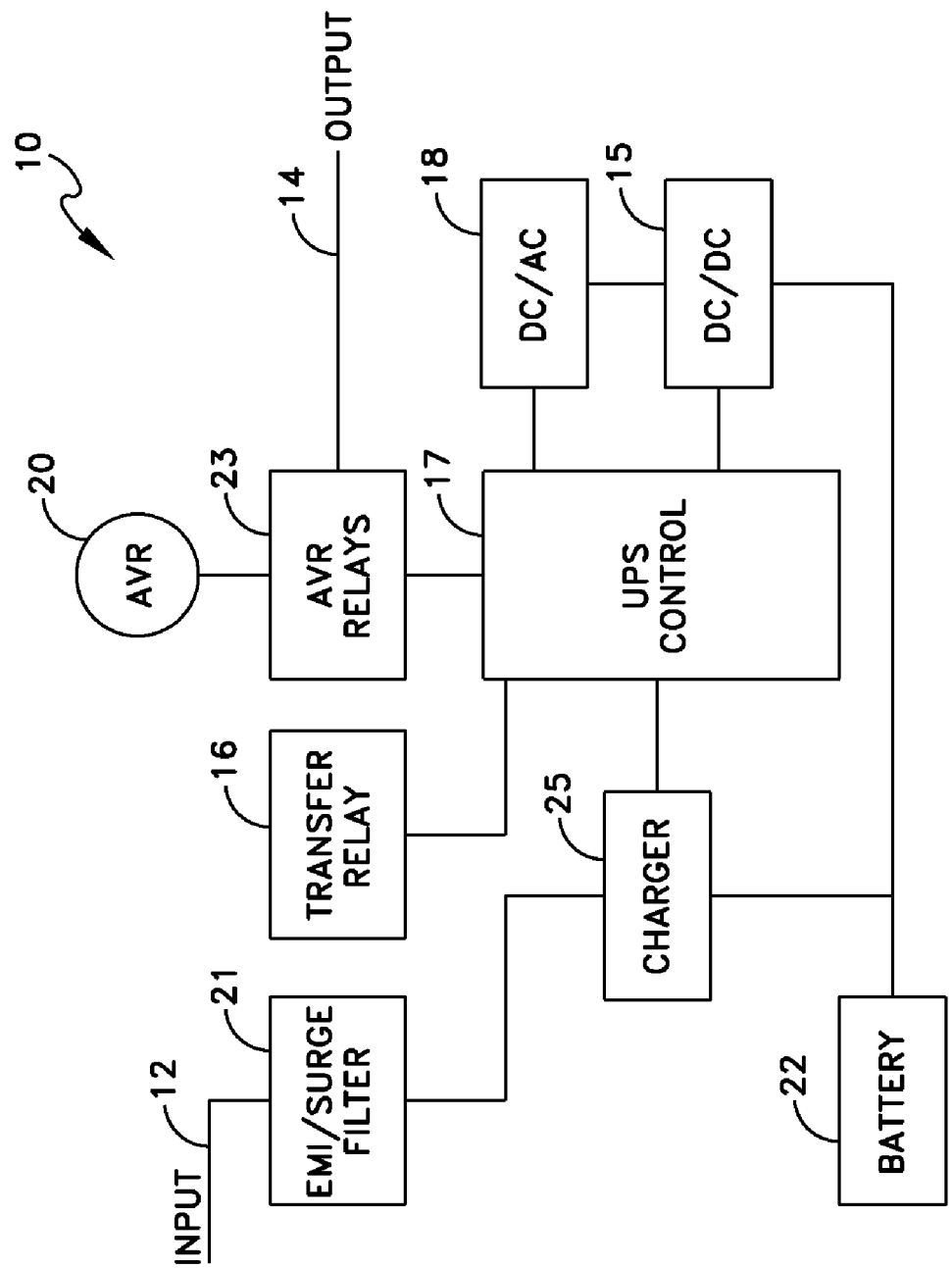
FIG. 1 is a block diagram of an uninterruptible power supply including a DC-DC converter in accordance with one embodiment.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

One embodiment of an uninterruptible power supply in accordance with the present invention will now be described with reference to FIG. 1 which shows a block diagram of a line interactive uninterruptible power supply (UPS) 10 for providing AC power to a load. The UPS includes an input 12 to receive AC power from an AC power source, an output 14 that provides AC power, a battery 22 coupled to a DC to DC converter 15, an inverter 18 operatively coupled to the DC to DC converter 15 to receive DC power and to provide AC power, a transfer relay 16 selectively coupled to the UPS input 12 and the inverter 18, a UPS controller 17, an EMI/Surge filter 21, a battery charger 25 and an automatic voltage regulation (AVR) transformer 20 coupled to the transfer relay 16, and at least one AVR relay 23. The UPS 10 further includes a UPS controller 17 that monitors and controls the operation of the UPS 10. The AVR 20 and its associated relays are optional devices used in at least one embodiment to allow the UPS 10 to operate over a wider range of input voltages. Operation of the AVR 20 is described in co-pending U.S. patent application Ser. No. 12/360,648, filed Jan. 27, 2009, titled System and Method for Limiting Losses in an Uninterruptible Power Supply, which is hereby incorporated herein be reference.

The UPS 10 operates as follows. The UPS 10 receives input AC power from the AC power source through the input 12, filters the input AC power and provides filtered AC power to the transfer relay 16. The transfer relay 16 receives the filtered power and also receives power from the DC/AC inverter 18. The controller 17 determines whether the power available from the AC power source is within predetermined tolerances, and if so, controls the transfer relay to provide the power from the AC power source to the output. If the power from the AC power source is not within the predetermined tolerances, which may occur because of "brown out" or "black out" conditions, or due to power surges, then the controller 17 controls the transfer relay 16 to provide the power from the inverter 18.

The inverter 18 of the UPS 10 receives DC power from the DC-DC converter 15 and converts the DC power to AC power and regulates the AC power to predetermined specifications. Depending on the capacity of the battery 22 and the power requirements of the load, the UPS 10 can provide power to the load during brief power source dropouts or for extended power outages.

Using data stored in associated memory, the controller 17 performs one or more instructions and monitors and controls operation of the UPS 10. In some examples, the controller 17 may include one or more processors or other types of controllers. In one example, the controller 17 is a commercially available, general purpose processor. In another example, the controller 17 performs a portion of the functions disclosed herein on a general purpose processor and performs another portion using an application-specific integrated circuit (ASIC) tailored to perform particular operations. As illustrated by these examples, embodiments in accordance with the present invention may perform the operations described herein using many specific combinations of hardware and software and the invention is not limited to any particular combination of hardware and software components.

The associated memory of the controller 17 includes data storage that stores computer readable and writable information required for the operation of the UPS 10. This information may include, among other data, data subject to manipulation by the controller 17 and instructions that are executable by the controller 17 to manipulate data. The data storage may be a relatively high performance, volatile, random access memory such as a dynamic random access memory (DRAM) or static memory (SRAM) or may be a nonvolatile storage media such as magnetic disk or flash memory. Various embodiments in accord with the present invention can organize the data storage into particularized and, in some cases, unique structures to perform the aspects and functions disclosed herein. In addition, these data structures may be specifically configured to conserve storage space or increase data exchange performance.

In typical existing UPS's the DC-DC converter is often oversized to meet peak power demand of pulsed loads that may require relatively high peak power for a short period of time. For example, a typical pulsed load powered by a UPS may operate with a 25% duty cycle, drawing input current over only 25% of the UPS output AC waveform. It is not uncommon for a 1500 VA UPS to provide a load with 4.5 kW of power over a 25% duty cycle. In such a situation, the peak power demand, rather than the average power demand, drives the design of the DC-DC converter and places high peak current/power requirements on the components that can be used in the design of the DC-DC converter. Components, such as switches and inductors, which are able to handle the high switching frequency and high peak current of the DC-DC converter can be large and costly. In at least one embodiment of the present invention, the need for large and costly components in the DC-DC converter is eliminated by reducing the peak current through the switches of the DC-DC converter, and providing current to the load during peak periods of the duty cycle using a capacitor coupled to the output of the DC-DC converter.

One embodiment of a DC-DC converter in accordance with the present invention will now be described with reference to FIG. 2 which shows a schematic diagram of a DC-DC converter 30 configured to regulate DC power from a battery 32 and provide DC power to a load 62. The DC-DC converter 30 may be used as the converter 15 in the UPS of FIG. 1, and in this configuration, the load 62 includes the inverter 18 and a load coupled to the output of the UPS 10. The DC-DC converter 30 is a full bridge DC-DC converter which utilizes current mode control and includes a set of power switches 34, 36, 38 and 40, a power transformer 43, a rectifier 42, a power inductor 50 and output capacitor 52. The portion of the DC-DC converter excluding the output capacitor may be referred to herein as the power stage of the DC-DC converter.

The operation of the DC-DC converter 30 will now be described with reference to FIGS. 1-2. DC power from the battery 32 is supplied to the power switches 34, 36, 38, 40 and to the power transformer 43. The power switches 34, 36, 38 and 40 and power transformer 43 are operated by a controller, such as controller 17, to produce a regulated AC signal at the output of the transformer. The rectifier 42 rectifies the AC signal and provides a rectified AC signal to the power inductor 50. The power inductor 50 supplies DC power to the output 60 of the DC-DC converter 30 and the load 62.

Figure 2:
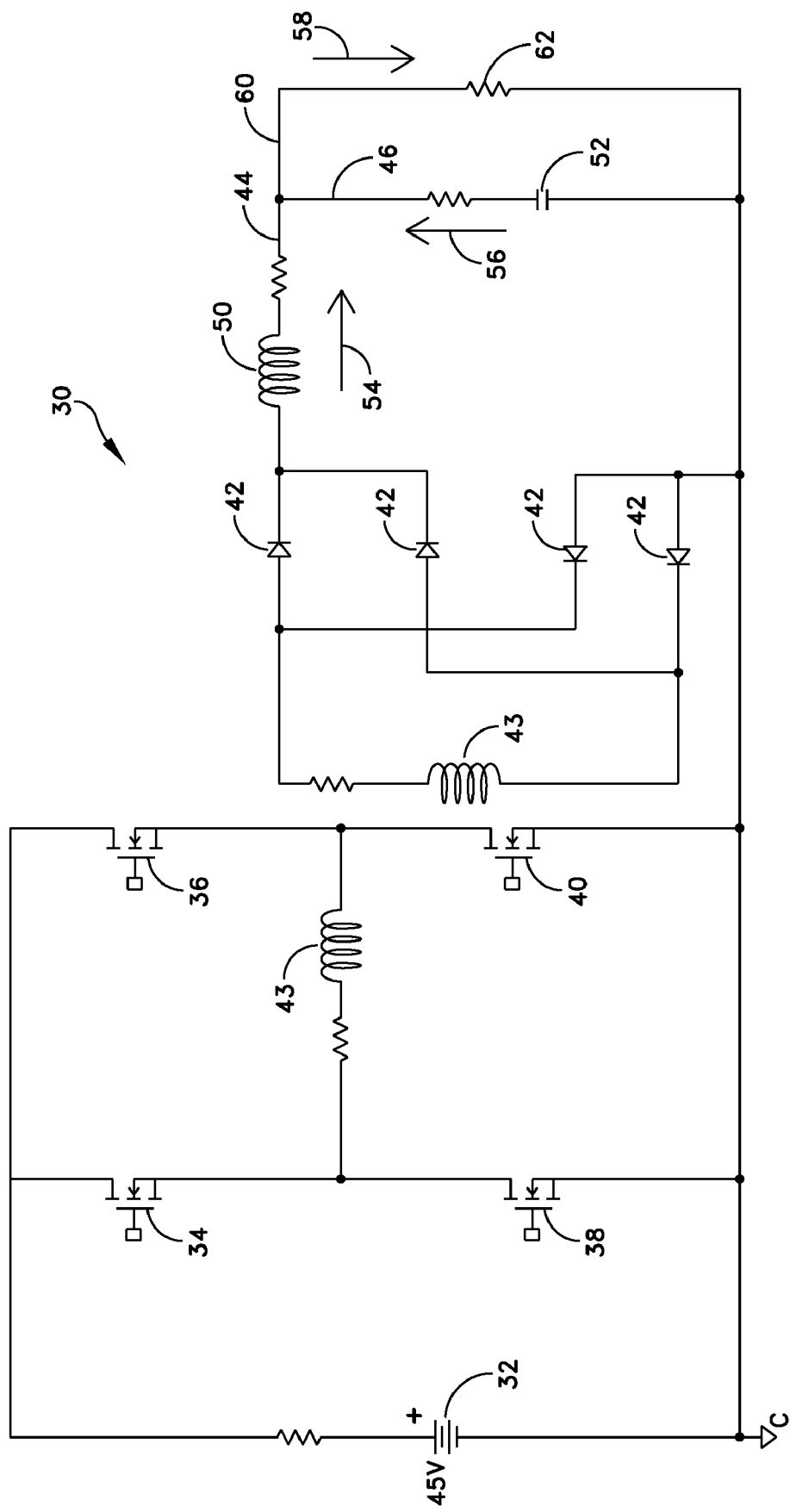
FIG. 2 is a schematic view of a DC-DC converter included in a UPS in accordance with one embodiment.

In FIG. 2, three different currents in the DC-DC converter are represented by arrows 54, 56 and 58. The current 54 is the output current from the power stage of the DC-DC converter, current 56 is current supplied by the capacitor 52, and current 58 is the load current which is equal to the total output current of the DC-DC converter (current 54+current 56). S In typical prior art converters, the components of the DC-DC converter are designed to handle the specified maximum peak load current value for the DC-DC converter, and in normal operation of these prior art converters, current 58 is substantially equal to current 54, and the voltage across the capacitor remains constant at a specified value when the DC-DC converter is providing the specified maximum peak current.

To limit the size and the cost of the switches, the transformer and the inductor within the DC-DC converter 30, the current 58 is limited by the controller (by controlling the switches) to a value that is approximately one half of the specified maximum peak load current value of the DC-DC converter 30. In other embodiments, the controller may limit the current to values other than one half of the maximum peak load current value. For loads that draw the specified maximum peak current value or any value greater than that limited by the controller, the remainder of the current is supplied by the capacitor 52 following current path 56. When current is provided by capacitor 52, the output voltage will drop, based on the magnitude of the current 56 and the capacitance value of the capacitor. As described in further detail below, the DC-DC converter 30 may be designed to operate at a specified maximum peak current value and a minimum allowable output voltage.

In one embodiment of the invention, the specified maximum peak current value has an associated limited duty cycle, for example, 25%. In this embodiment, when the pulsed load is not receiving power from the DC-DC converter 30, the DC-DC converter 30 charges the capacitor 52 resulting in a negative value for current 56 during the charge mode. Through the repetitive charging and discharging of the capacitor, the DC-DC converter 30 is able to meet the specified maximum peak current value without requiring the components of the DC-DC converter to sustain the maximum peak current value.

As a result of the reduction in peak current through the DC-DC converter 30, the rms current through the DC-DC converter is also reduced, allowing smaller and cheaper components to be used in the design of the DC-DC converter. For example, because of the reduction in peak and rms currents, the power inductor 50 is able to utilize smaller wire and is required to store less energy. This results in a smaller power inductor 50. Also, as a result of the reduction in peak current, current rating of the power switches 34, 36, 38, 40 can be reduced in size resulting in smaller, lower cost power switches 34, 36, 38, 40. Heat sink size may also be reduced. Finally, as a result of the reduction in peak and RMS current, the copper wire requirements of the power transformer 43 are reduced, resulting in a smaller core volume and core area of the power transformer 43. Additional components of the DC-DC converter may also be able to be reduced in size and cost as a result of the reduction in peak and RMS current.

Figure 3:
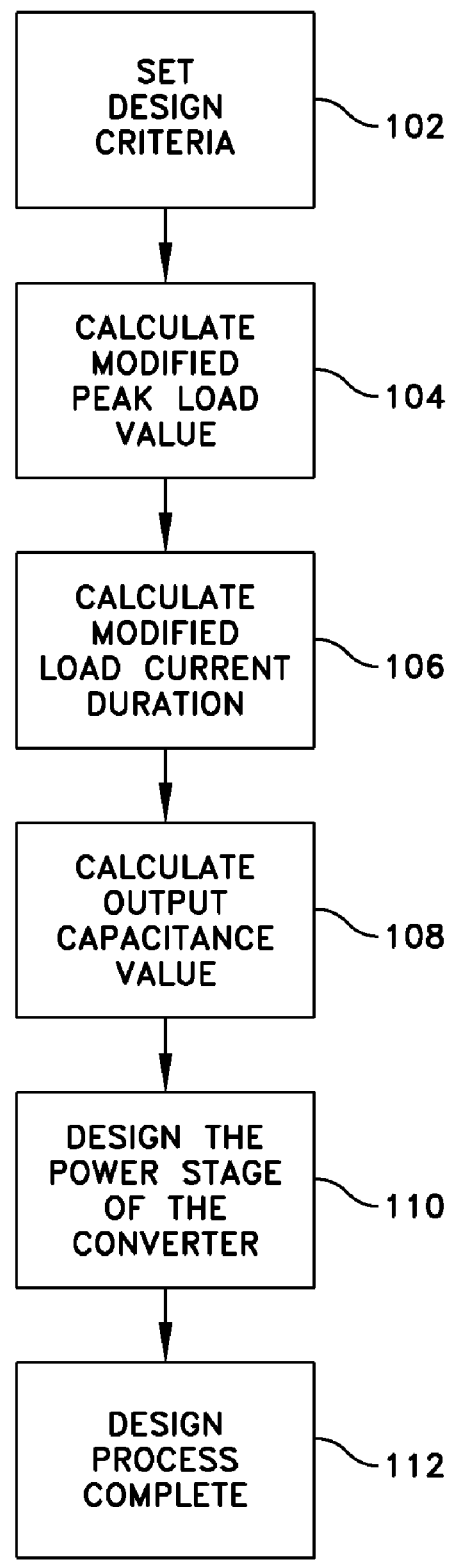
FIG. 3 is a flow chart of a process for designing a DC-DC Converter in accordance with one embodiment.

One example of a design process 100 for a DC-DC converter with a reduced peak current as described above will now be described with reference to FIG. 3, which shows a flowchart of the design process. In a first stage 102 of the design process, several design criteria for the DC-DC converter are set based on the anticipated load and/or characteristics of a UPS containing the DC-DC converter. The criteria includes the peak load current value Ipk, the peak load current duration Tcond_load, the nominal DC output voltage, Vo_dcdc_nom, and the allowable minimum output voltage for the load, Vo_dcdc_min. At the next stage 104, the modified peak load current value Idcdc_pk is calculated. The modified peak load current value Idcdc_pk is the maximum current provided by the power stage of the DC-DC converter 30 (current 54 in FIG. 2). In this example embodiment, the modified peak load current value is equal to half of the maximum peak load current value (Idcdc_pk=Ipk*50%), however, other values may be used in other embodiments.

At the next stage 106 in the process 100, the modified DC-DC load current duration Tcond_dcdc, for the DC-DC converter is calculated based on the peak load current duration Tcond_load multiplied by the ratio between the peak load current value Ipk and the modified peak load current value Idcdc_pk. In the example embodiment, this results in the modified DC-DC load current duration being equal to twice that of the peak load current duration (Tcond_dcdc=2*Tcond_load).

Next, at stage 108, the capacitance value at the output of the DC-DC converter is calculated based on the nominal DC output, Vo_dcdc_nom, and the allowable minimum output voltage for the load, Vo_dcdc_min. In one embodiment, the minimum capacitance value for the capacitor Cmin is determined by Cmin=(Ipk/2)*Tcond_load/(Vo_dcdc_nom−Vo_dcdc_min).

The DC-DC converter is designed at stage 110 in the manner known, except that the modified peak load current value Idcdc_pk and the modified DC-DC load current duration Tcond_dcdc are used to design the converter and the controller is configured to operate the power switches and power transformer to limit the peak current of the power stage of the DC-DC converter to the modified peak load current value Idcdc_pk. At stage 112, the process 100 is complete resulting in a design for a DC-DC converter in one embodiment having a reduced peak current and as a result, smaller and cheaper components, reducing the overall footprint ant the cost of the converter. Once the design is complete, the DC-DC converter may be constructed.

In the description above, embodiments of a DC-DC converter have been described for use in a UPS. In other embodiments, DC-DC converters may be used in other power systems and may also be used as stand-alone DC-DC converters. Further, the UPS of FIG. 1 is a line interactive UPS, and at least one embodiment of a DC-DC converter described herein may be used with other types of UPS's including on-line UPS's and off-line UPS's.

At least one embodiment described above is directed to a DC-DC converter and the design process for such a converter. In at least one example, the DC-DC converter is implemented using a full-bridge converter. In other embodiments, DC-DC converters may utilize other topologies, and aspects of embodiments of the present invention may be used with buck derived converters, boost converters and buck-boost converters.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of controlling a DC-DC converter having a predetermined maximum peak load current value, the DC-DC converter including first and second outputs to couple to a load, a capacitor coupled across the first and second outputs, an input to couple to a DC source having a DC voltage, a plurality of switches configured to convert the DC voltage to an AC voltage, and a transformer having a first winding and a second winding, the first winding being coupled to the plurality of switches and the second winding being coupled to the first and second outputs, the method comprising:
   in a first mode of operation, charging the capacitor to a predetermined output voltage value;
   in a second mode of operation, providing output current having the maximum peak load current value to a load coupled to the output of the DC-DC converter, wherein a first portion of the output current is provided by the DC-DC converter and a second portion of the output current is provided by discharging the capacitor to a voltage value that is less than the predetermined output voltage value; and
   controlling the plurality of switches, in the second mode of operation, to limit current in the second winding to a value that is less than the maximum peak load current value.

2. The method of claim 1, wherein the value is approximately 50% of the maximum peak load current value.

3. The method of claim 2, further comprising receiving input power at the input from a battery.

4. The method of claim 3, further comprising providing the output current to the input of an inverter circuit.

5. The method of claim 4, further comprising controlling the plurality of switches and the inverter circuit using a controller contained within an uninterruptible power supply.

6. The method of claim 1, further comprising in the first mode of operation, providing output current having a value that is less than the maximum peak load current.

7. An uninterruptible power supply comprising:
   an input to receive power from a first power source;
   an output to provide power to a load;
   an inverter coupled to the output;
   a second input to receive power from a second power source;
   a DC-DC converter coupled to the second input and including first and second outputs coupled to the inverter, a capacitor coupled across the first and second outputs, a plurality of switches configured to convert the DC voltage to an AC voltage, and a transformer having a first winding and a second winding, the first winding being coupled to the plurality of switches and the second winding being coupled to the first and second outputs; and
   a controller coupled to the DC-DC converter and configured to control the DC-DC converter in a first mode of operation to charge the capacitor to a predetermined output voltage value, and configured to control the DC-DC converter in a second mode of operation to provide output current having a maximum peak load current value, wherein a first portion of the output current is provided by the DC-DC converter and a second portion of the output current is provided by discharging the capacitor to a voltage value that is less than the predetermined output voltage value, and wherein the controller is further configured to control the plurality of switches, in the second mode of operation, to limit current in the second winding to a value that is less than the maximum peak load current value.

8. The uninterruptible power supply of claim 7, wherein the value is approximately 50% of the maximum peak load current value.

9. The uninterruptible power supply of claim 8, further comprising the second power source, and wherein the second power source includes a battery.

10. The uninterruptible power supply of claim 7, wherein the controller is further configured to control the DC-DC converter in the first mode of operation to provide output current to the inverter having a value that is less than the maximum peak load current.

11. A process for producing a DC-DC converter having a peak load current value, a peak load current duration, a nominal DC output voltage, and an allowable minimum output voltage, the process comprising:
   determining a modified peak load current value for the DC-DC converter by multiplying the peak load current value by a factor less than 1;
   determining a modified DC-DC load current duration for the DC-DC converter by dividing the peak load current duration by the factor; and
   designing a power stage of the DC-DC converter using the modified peak load current value and the modified DC-DC load current duration.

12. The process of claim 11, further comprising building the power stage of the DC-DC converter based on the design.

13. The process of claim 12, further comprising:
   determining a value of an output capacitor for the DC-DC converter based at least in part on the nominal DC output voltage and the allowable minimum output voltage; and
   coupling the output capacitor to the power stage.

14. The process of claim 13, further comprising coupling a controller to the DC-DC converter, wherein the controller is configured to control components of the power stage, and limit current from the power stage to the modified DC-DC load current value.

15. The process of claim 14, wherein the factor is equal to 0.5.

16. An uninterruptible power supply comprising:
   an input to receive power from a first power source;
   an output to provide power to a load;
   an inverter coupled to the output;
   a second input to receive power from a second power source;
   a DC-DC converter coupled to the second input and including first and second outputs coupled to the inverter, a power stage that provides output power at the first and second outputs, a capacitor coupled across the first and second outputs, a plurality of switches configured to convert the DC voltage to an AC voltage, and a transformer having a first winding and a second winding, the first winding being coupled to the plurality of switches and the second winding being coupled to the first and second outputs; and means for controlling the DC-DC converter in a first mode of operation to charge the capacitor to a predetermined output voltage value, for controlling the DC-DC converter in a second mode of operation to provide output current having a maximum peak load current value, such that a first portion of the output current is provided by the power stage and a second portion of the output current is provided by discharging the capacitor to a voltage value that is less than the predetermined output voltage value, and for controlling the plurality of switches, in the second mode of operation, to limit current in the second winding to a value that is less than the maximum peak load current value.

17. The uninterruptible power supply of claim 16, wherein the value is approximately 50% of the maximum peak load current value.

18. The uninterruptible power supply of claim 17, further comprising the second power source, and wherein the second power source includes a battery.

19. The method of claim 1, wherein the act of controlling includes controlling the plurality of switches, in the second mode of operation, to limit current in the second winding to a value that is less than the maximum peak load current value for a duration of the second mode of operation.

* * * * *